(12) United States Patent
Naito et al.

(10) Patent No.: US 6,689,185 B2
(45) Date of Patent: *Feb. 10, 2004

(54) NIOBIUM POWDER FOR CAPACITOR, SINTERED BODY USING THE POWDER AND CAPACITOR USING THE SAME

(75) Inventors: Kazumi Naito, Chiba (JP); Kazuhiro Omori, Chiba (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/322,430

(22) Filed: Dec. 19, 2002

(65) Prior Publication Data

US 2003/0117766 A1 Jun. 26, 2003

Related U.S. Application Data

(63) Continuation of application No. 09/839,398, filed on Apr. 23, 2001, now Pat. No. 6,540,810.
(60) Provisional application No. 60/240,974, filed on Oct. 18, 2000.

(30) Foreign Application Priority Data

Apr. 21, 2000 (JP) ..................... P2000-121485

(51) Int. Cl.⁷ .................................. B22F 1/00
(52) U.S. Cl. ........................... 75/252; 75/255
(58) Field of Search ................... 75/255, 252

(56) References Cited

U.S. PATENT DOCUMENTS

| 4,084,965 A | 4/1978 | Fry |
| 4,149,876 A | 4/1979 | Rerat |
| 4,954,169 A | 9/1990 | Behrens |
| 4,964,906 A | 10/1990 | Fife |
| 5,448,447 A | 9/1995 | Chang |
| 6,024,914 A * | 2/2000 | Yoshida ................. 419/23 |
| 6,136,062 A | 10/2000 | Loffelholz et al. |
| 6,171,363 B1 | 1/2001 | Shekhter et al. |
| 6,540,810 B2 * | 4/2003 | Naito .................. 75/255 |

FOREIGN PATENT DOCUMENTS

| GB | 1 219 748 | 1/1971 |
| JP | 60-121207 | 6/1985 |
| JP | 01-242702 | 9/1989 |
| JP | 02-039417 | 2/1990 |
| JP | 03-150822 | 6/1991 |
| JP | 05-009790 | 1/1993 |
| JP | 10-242004 | 9/1998 |
| WO | WO 98/19811 | 5/1998 |

OTHER PUBLICATIONS

"Reactions During Sintering of Niobium Powder from Aluminothermic Reduction Product," R&HM, Dec. 1985, vol. 4, pp. 189–194.

"The Influence of Gas Atmospheres on the First-Stage Sintering of High-Purity Niobium Powders", Metallurgical Transactions, Jun. 1984, vol. 15, pp. 1111–1116.

* cited by examiner

*Primary Examiner*—Ngoclan Mai
(74) *Attorney, Agent, or Firm*—Sughrue Mion, PLLC

(57) ABSTRACT

An object of the present invention is to provide a niobium sintered body free of reduction in the CV value, a niobium powder for use in the manufacture of the niobium sintered body, and a capacitor using the niobium sintered body. A niobium powder of the present invention has niobium and tantalum, where the tantalum is present in an amount at most of about 700 ppm by mass. A sintered body and a capacitor each is manufactured using the niobium powder.

4 Claims, No Drawings

NIOBIUM POWDER FOR CAPACITOR, SINTERED BODY USING THE POWDER AND CAPACITOR USING THE SAME

CROSS REFERENCE TO RELATED APPLICATIONS

This is a continuation of Application No, 09/839,398 filed Apr. 23, 2001, now U.S. Pat. No. 6,540,810, the disclosure of which is incorporated herein by reference, which claims benefit of Provisional Application No. 60/240,974 filed Oct. 18, 2000.

FIELD OF THE INVENTION

The present invention relates to a niobium powder for a capacitor free of reduction in the capacitance, a sintered body using the powder and a capacitor using the sintered body.

BACKGROUND OF THE INVENTION

There is a demand for capacitors for use in electronic instruments such as potable telephone and personal computer to have a small size and a large capacitance. Among these capacitors, a tantalum capacitor is preferably used because of its large capacitance per unit volume and good performance. In a tantalum capacitor, a sintered body of tantalum powder is generally used for the anode moiety. In order to increase the capacitance of the tantalum capacitor, it is necessary to increase the mass of the sintered body or to use a sintered body increased in surface area by pulverizing the tantalum powder. The former method of increasing the mass of the sintered body necessarily incurs enlargement of the capacitor shape and cannot satisfy the requirement for downsizing.

On the other hand, in the latter method of pulverizing tantalum powder to increase the surface area, the pore size of the tantalum sintered body is reduced or closed pores increase at the stage of sintering. Therefore, impregnation of the cathode agent in the later process becomes difficult.

As means for solving these problems, a capacitor using a sintered body of a material having a dielectric constant larger than that of tantalum is being studied. The material having a larger dielectric constant includes niobium. JP-A-55-157226 (the term "JP-A" as used herein means an "unexamined published Japanese patent application") discloses a method for producing a sintered element for capacitors, where an alloy mainly comprising tantalum, titanium, niobium, aluminum or the like is used as a valve-acting powder and the agglomerated powder of the alloy is molded under pressure into a niobium fine powder having a particle size of 2.0 μm or less. The fine powder is sintered, the molded and sintered body is cut into fine pieces, a lead part is joined thereto, and then those pieces are again sintered. However, JP-A-55-157226 neither discloses nor suggests the tantalum content or the amount of niobium powder and moreover, the properties of the capacitor manufactured using this powder are not disclosed at all.

U.S. Pat. No. 4,084,965 discloses a capacitor manufactured using a niobium powder of 5.1 μm obtained by hydrogenating a niobium ingot and pulverizing it. However, U.S. Pat. No. 4,084,965 neither discloses nor suggests the tantalum content and the amount of niobium powder.

Although niobium is deficient in the leakage current (hereinafter simply referred to as "LC value"), the present inventors have previously proposed that the LC value can be improved by nitriding a part of niobium (see, JP-A-10-142004). Increased reduction in the LC value can be attained, for example, by elevating the sintering temperature at the time of manufacturing the above-described niobium sintered body. However, if the sintering temperature is elevated, there arises a problem that the product of the capacitance (simply "C") per mass of the sintered body manufactured and the chemical forming voltage (simply "V") at the time of forming a dielectric material on the surface of the sintered body (hereinafter the product is simply referred to as "CV value") becomes small.

The CV value is considered to be proportional to the surface area of the sintered body and, the surface area of the sintered body is estimated to depend on the specific surface area of the niobium powder with the same production conditions and molding conditions of niobium powder and with same sintering conditions in obtaining a sintered body. However, even if a niobium sintered body is manufactured from niobium powder using the same conditions in respective stages, the CV value of the manufactured niobium sintered body is not always the same but disadvantageously decreases.

SUMMARY OF THE INVENTION

By taking into account these problems, the present invention provides a niobium sintered body free of reduction in the CV value, a niobium powder for use in the manufacture of this niobium sintered body, and a capacitor using this niobium sintered body.

As a result of extensive investigations, the present inventors have developed a niobium powder for capacitors, which has a tantalum content (hereinafter "ppm by mass" is simply referred to as "ppm") reduced to a predetermined value or less thereby enabling the manufacture of a niobium sintered body free of reduction in the CV value. Based on this finding, the present invention has been accomplished. More specifically, the present invention includes the following embodiments.

(1) A niobium powder comprising niobium and tantalum, wherein the tantalum is present in an amount of at most about 700 ppm by mass.

(2) The niobium powder as described in 1 above, which is partially nitrided.

(3) The niobium powder as described in 2 above, wherein the amount nitrided is from about 10 to about 100,000 ppm by mass.

(4) A sintered body comprising the niobium powder described in 1 to 3 above.

(5) A method for producing a niobium sintered body, comprising sintering a niobium powder compact at a high temperature, wherein the niobium powder is the niobium powder described in any one of 1 to 3 above and heating the niobium powder under reduced pressure at about 500 to about 2,000° C. for about 1 minute to about 10 hours.

(6) The method for producing a niobium sintered body as described in 5 above, wherein the niobium powder is obtained by granulating a niobium powder having an average primary particle size of about 1 μm or less.

(7) A capacitor comprising a pair of electrodes having interposed therebetween a dielectric material, one of the electrodes being the niobium sintered body described in 4 above.

(8) The capacitor as described in 7 above, which has a dielectric material comprising niobium oxide formed by electrolytic oxidation.

(9) The capacitor as described in 7 above, wherein the other electrode is at least one material (compound) selected from the group consisting of an electrolytic solution, an organic semiconductor and an inorganic semiconductor.

(10) The capacitor as described in 7 above, wherein the other electrode is formed of at least one organic semiconductor selected from the group consisting of an organic semiconductor comprising benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer containing two or more repeating units represented by formula (1) or (2):

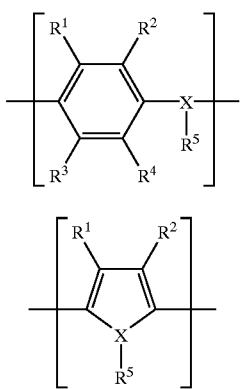

wherein $R^1$ to $R^4$, which may be the same or different, each represents hydrogen, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents hydrogen or an alkyl group having from 1 to 6 carbon atoms, and $R^1$ and $R^2$, or $R^3$ and $R^4$ may be combined with each other to form a ring.

(11) The capacitor as described in 7 above, wherein the organic semiconductor is at least one selected from the group consisting of polypyrrole, polythiophene and substitution derivatives thereof.

(12) An electronic circuit using the capacitor as described in 7 above.

(13) Electronic equipment using the capacitor as described in 7 above.

DESCRIPTION OF THE PREFERRED EMBODIMENTS

One embodiment for obtaining the sintered body of the present invention is described below.

The raw material compound used for the niobium powder may be a generally available material. For example, a niobium powder obtained by the reduction of niobium halide with magnesium or sodium, by the sodium reduction of potassium fluoroniobate, by the molten-salt (NaCl+KCl) electrolysis of potassium fluoroniobate onto a nickel anode, or by the introduction of hydrogen into a metal niobium ingot and then pulverizing and dehydrogenating the ingot, may be used. The niobium powder obtained by these methods contains tantalum intermingled from the raw material.

The present inventors have found that it is important in the present invention to set the amount of tantalum contained in the niobium powder to about 700 ppm or less. If the tantalum content exceeds about 700 ppm, the VC value of the niobium sintered body manufactured may decrease. The amount of tantalum contained in the niobium powder can be reduced to about 700 ppm or less, for example, by purifying the manufactured niobium powder through electron beam dissolution or by mixing therewith a purified product.

In the present invention, the niobium powder suitably has an average primary particle size of about 1 $\mu$m or less, preferably from about 1 to about 0.1 $\mu$m. If the average primary particle size exceeds about 1 $\mu$m, a sintered body characterized by high CV and low LC, which is one object of the present invention, can be hardly obtained and therefore, such a powder is not preferred as a raw material. For the average particle size of niobium powder as used in the present invention, a $D_{50}$ value (a particle size where the cumulative % by mass is 50% by mass) measured using a particle size distribution measuring apparatus ("Microtrack", trade name) may be employed.

A niobium powder having an average primary particle size in the above-described range can be obtained, for example, by a method of pulverizing a sodium reductant of potassium fluoroniobate, a method of pulverizing and dehydrogenating a hydride of a niobium ingot or a method of producing niobium oxide through carbon reduction. When using the method of pulverizing and dehydrogenating a hydride of a niobium ingot is used, a niobium powder having a desired average particle size can be obtained by controlling the amount of the niobium ingot hydrogenated and the pulverization time in a pulverizer.

The niobium powder of the present invention is a niobium powder having the above-described tantalum content and is preferably a partially nitrided niobium powder. The amount nitrided is about 10 to about 100,000 ppm. In the case where after manufacturing a sintered body from the niobium powder, a dielectric material is formed on the surface of the sintered body, as described later and the leakage current (LC value) is measured in an aqueous phosphoric acid solution, the amount nitrided is preferably from about 500 to about 7,000 ppm so as to obtain a small LC value. The term "amount nitrided" as used herein is not an amount of nitride adsorbed to the niobium powder but means an amount of niobium powder chemically nitrided.

The nitriding of the niobium powder can be performed by any one of liquid nitriding, ion nitriding and gas nitriding or by a combination thereof. A gas nitriding treatment making use of a nitrogen gas atmosphere is preferred because the apparatus is simple and the operation is easy. Gas nitriding using a nitrogen gas atmosphere can be achieved by allowing the above-described niobium powder to stand in a nitrogen atmosphere. A niobium powder nitrided in the desired amount can be obtained by a nitriding treatment at an atmosphere temperature of about 2,000° C. or less for a standing time of about 1 minute to about 10 hours. The treatment time can be shortened by treating the niobium powder at a high temperature. The amount of the niobium powder nitrided can be controlled by selecting the conditions through a preliminary experiment for finding out a nitriding temperature and a nitriding time for a material to be nitrided.

The niobium powder of the present invention may be used after granulating the niobium powder into an appropriate shape or may be used by mixing an appropriate amount of a non-granulated niobium powder after the granulation. The granulation may be performed by a conventionally known method. Examples thereof include a method where a non-granulated niobium powder is allowed to stand at a high temperature in vacuum thereby becoming integrated (coagulation-solidified) and then cracked, and a method where an appropriate binder and a non-granulated niobium powder are mixed and the mixture is cracked.

At this time, the niobium powder and the binder may be kneaded using a solvent and after the kneading, the kneaded powder is dried and cracked. The binder is generally polyvinyl alcohol, acrylic resin or the like. For the solvent, one selected from acetone, alcohols, esters such as butyl acetate, and water can be used.

The thus-obtained niobium granulated product suitably has an average particle size of about 300 $\mu$m or less, preferably about 200 $\mu$m or less, more preferably from about 1 to about 200 $\mu$m.

The niobium sintered body of the present invention is produced by sintering the above-described niobium powder. One example of the method for producing the sintered body is described below, however, the production method of the sintered body is not limited to this example. The niobium powder is pressure-molded into a predetermined shape and then heated under reduced pressure, for example, a pressure of $1.33 \times 10^{-4}$ Pa (Pascal), for a few minutes to a few hours at a temperature of about 500 to about 2,000° C., preferably from about 900 to about 1,500° C., more preferably from about 900 to about 1,250° C., thereby obtaining the sintered body.

The lower limit of the temperature in sintering the niobium powder varies depending on the average particle size of the niobium powder and as the average particle size of the niobium powder is smaller, the lower limit of the temperature decreases. When the sintering temperature is varied while setting the average particle size to be constant, the sintered body manufactured suffers from a large LC value despite a large CV value and can hardly endure the practical use as a material of capacitors if the sintering temperature is low.

The production of a capacitor element is described below.

A lead wire comprising a valve-acting metal and having an appropriate shape and length is prepared and integrally molded at the pressure-molding of the above-described niobium powder so that a part of the lead wire is inserted into the inside of the compact where the lead wire can work out to a leading line of the sintered body.

By using the sintered body for one electrode and interposing a dielectric material between this electrode and another electrode, a capacitor element can be produced. The dielectric material of the capacitor is preferably a dielectric material comprising niobium oxide. The dielectric material comprising niobium oxide can be easily obtained by chemically forming the niobium sintered body used for one electrode in an electrolytic solution. The chemical forming of the niobium electrode in an electrolytic solution is usually performed using an aqueous protonic acid solution, for example, an aqueous solution of about 0.1% phosphoric acid or an aqueous sulfuric acid solution. In the case where the dielectric material comprising niobium oxide is obtained by chemically forming the niobium electrode in an electrolytic solution, the capacitor of the present invention is an electrolytic capacitor with the niobium side being the anode.

The other electrode of the capacitor of the present invention is not particularly limited, and for example, at least one material (compound) selected from electrolytic solutions, organic semiconductors and inorganic semiconductors well-known in the art of aluminum electrolytic capacitors may be used. Specific examples of the electrolytic solution include a dimethylformamide-ethylene glycol mixed solution having dissolved therein about 5% by mass of an isobutyltripropylammonium borotetrafluoride electrolyte, and a propylene carbonate-ethylene glycol mixed solution having dissolved therein about 7% by mass of tetraethylammonium borotetrafluoride. Specific examples of the organic semiconductor include an organic semiconductor comprising benzene-pyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer containing two or more repeating units represented by formula (1) or (2):

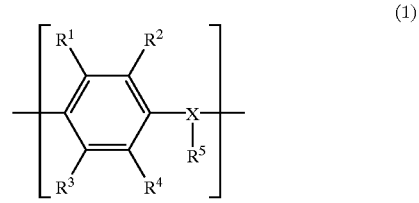

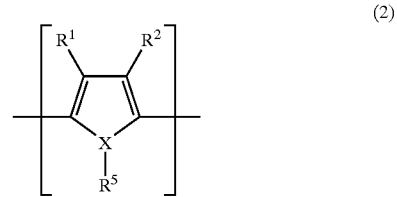

wherein $R^1$ to $R^4$, which may be the same or different, each represents hydrogen, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents hydrogen or an alkyl group having from 1 to 6 carbon atoms, and $R^1$ and $R^2$, or $R^3$ and $R^4$ may be combined with each other to form a ring. For the dopant, any known dopant can be used without limit.

Specific examples of the inorganic semiconductor include an inorganic semiconductor mainly comprising lead dioxide or manganese dioxide, and an inorganic semiconductor comprising triiron tetraoxide. These semiconductors may be used individually or in combination of two or more thereof.

Examples of the polymer containing two or more repeating units represented by formula (1) or (2) include polyaniline, polyoxyethylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxothiophene).

When the organic or inorganic semiconductor is used and has an electrical conductivity of about $10^{-2}$ to about $10^3$ S.cm$^{-1}$, the manufactured capacitor can have a smaller impedance value and can be further increased in the capacitance at a high frequency.

When the other electrode is a solid, an electrical conductor layer may be provided thereon to attain good electrical contact with an exterior leading line (for example, lead frame).

The electrical conductor layer can be formed, for example, by the solidification of an electrically conducting paste, plating, metallization or formation of an electrically conducting resin film. Preferred examples of the electrically conducting paste include silver paste, copper paste, aluminum paste, carbonate paste and nickel paste, and these may be used individually or in combination of two or more thereof. In the case of using two or more kinds, the pastes may be mixed or individual pastes may be superposed one on another. The electrically conducting paste applied is then solidified by allowing it to stand in air or under heating. Examples of the plating include nickel plating, copper plating, silver plating and aluminum plating. Examples of the metal deposited include aluminum, nickel, copper and silver.

Specifically, for example, aluminum paste and silver paste are stacked in this order on the second electrode and the obtained laminate is sealed with epoxy resin or the like thereby constructing a capacitor. This capacitor may have a tantalum lead, which is sintering-molded integrally with the niobium sintered body or afterward welded.

The capacitor having the above-described construction of the present invention is applied with outer-jacketing, for example, jacketing by resin mold, resin case, metallic jacket case, dipping in resin or laminate film, and thereafter used as a capacitor product for various uses.

In the case where the other electrode is a liquid, the capacitor constructed by the above-described two electrodes and dielectric material is housed, for example, in a can electrically connected with the other electrode thereby forming a capacitor. In this case, the electrode side of the niobium sintered body is guided outside through a niobium or tantalum lead described above and at the same time, insulated from the can with an insulating rubber or the like.

By manufacturing a niobium sintered body as described above, a sintered body for capacitors free of reduction in the capacitance and a capacitor using the sintered body can be obtained.

The present invention is described in greater detail below by referring to the Examples, however, the present invention should not be construed as being limited to these Examples. Unless indicated otherwise herein, all parts, percents, ratios and the like are by weight.

The capacitor of the present invention is preferably used, for example, as a bypass capacitor, a coupling capacitor or a capacitor instead of a tantalum capacitor in an analog circuit or in a digital circuit.

A capacitor product, which has larger capacity per unit volume than that of tantalum, can be obtained by using the capacitor of the present invention. A smaller size electronic equipment, for example, a mobile computer, a potable telephone or an artificial satellite can be obtained by using the capacitor of the present invention, because many capacitor products are generally used in the equipment.

EXAMPLES

In the following Examples, the mass of tantalum contained in the niobium powder was determined by the atomic absorption analysis and the amount of niobium powder nitrided was determined using a nitrogen-oxygen analyzer manufactured by LECO.

The CV value of the niobium sintered body was defined as a product of the chemical forming voltage (V) during chemical forming in an aqueous 0.1% phosphoric acid solution at 80° C. for 200 minutes with the 120 Hz capacitance (C) obtained by measuring the sintered body after chemical forming, in an aqueous 30% sulfuric acid solution. The leakage current value (LC value) of the niobium sintered body was defined as a current value 3 minutes after the application of voltage when a sintered body chemically formed under the same conditions was measured in an aqueous 20% phosphoric solution at a voltage corresponding to 70% of the chemical forming voltage. In each Example, the numerical value is an average of the measured values of 20 units.

Examples 1 to 8

A niobium powder (containing about 900 ppm by mass of tantalum) purchased from Ko-jundo Kagaku Kenkyusho K. K. was electron beam dissolved to obtain a niobium lump (containing about 200 ppm by mass of tantalum). This niobium lump and a separately purchased niobium ingot (containing about 1,500 ppm by mass of tantalum) were each, after the introduction of hydrogen, wet-pulverized, dried and dehydrogenated to obtain niobium powders (each having an average particle size of 0.9 $\mu$m). The thus-obtained 2 kinds of niobium powders were appropriately mixed to manufacture 8 kinds of niobium powders different in tantalum content. The niobium powders were each allowed to stand at $1.33 \times 10^{-3}$ Pa and 1,050° C. for 60 minutes, then returned to room temperature and cracked to obtain granulated powders each having a particle size of 150 $\mu$m. The granulated powder were each further allowed to stand at 300° C. for 2 hours in a nitrogen stream (1 L/min), thereby obtaining partially nitrided granulated powders (each having a nitrided amount of 1,600 to 1,800 ppm by mass).

Subsequently, from a part of each granulated powder, 20 compacts having a size of 1.8×3.5×4.5 mm were manufactured and allowed to stand in a vacuum at $1.33 \times 10^{-3}$ Pa at a maximum temperature of 1,150° C. for 100 minutes to obtain niobium sintered bodies. The thus-manufactured sintered bodies were each chemically formed at 20 V and measured for the CV value and the LC value. The measured values are shown in Table 1.

TABLE 1

|  | Tantalum Content (mass ppm) | CV ($\mu$F · V/g) | LC ($\mu$A/g) |
| --- | --- | --- | --- |
| Example 1 | 200 | 120000 | 33 |
| Example 2 | 400 | 120000 | 37 |
| Example 3 | 500 | 120000 | 32 |
| Example 4 | 700 | 120000 | 26 |
| Example 5 | 800 | 94000 | 36 |
| Example 6 | 1000 | 80000 | 32 |
| Example 7 | 1300 | 80000 | 34 |
| Example 8 | 1500 | 80000 | 29 |

Examples 9 to 16

From each niobium powder, 20 sintered bodies were manufactured in the same manner as in Examples 1 to 8. Thereafter, the sintered bodies were each chemically formed in the same manner as in Examples 1 to 8 except for changing the chemical forming time to 5 hours, thereby forming a dielectric material on the surface. Thereafter, an operation of dipping each sintered body in a separately prepared 1:1 mixed solution of an aqueous 30% lead acetate solution and an aqueous 25% ammonium persulfate solution and allowing the reaction to proceed was repeated 20 times to form the other electrode comprising lead dioxide and lead sulfate (lead dioxide: 98%) on the dielectric material. On this electrode, a carbon layer and a silver paste layer were stacked in this order. Thereafter, the obtained laminate was placed on a lead frame and then the whole was sealed with an epoxy resin. In this way, 20 units of chip-type capacitors were manufactured. The capacitance and the LC value at 6.3 V of each capacitor manufactured are shown in Table 2. Unlike the methods used above for measuring the capacitance and LC value of the sintered body, the capacitance and the LC value were each measured by a conventionally known method of measuring these between terminals of the capacitor.

Examples 17 to 24

Capacitors were manufactured in the same manner as in Examples 9 to 16 except that the other electrode was an organic semiconductor of polypyrrole doped with anthraquinone sulfonic acid (formed by repeating at least 5 times an operation of impregnating pyrrole vapor into a sintered body having formed thereon a dielectric material and dipping the sintered body in an aqueous solution having dissolved therein anthraquinonesulfonic acid and ammonium persulfate). The evaluation results are shown in Table 2.

TABLE 2

|  | C ($\mu$F) | LC ($\mu$A) |
|---|---|---|
| Example 9 | 460 | 9 |
| Example 10 | 465 | 11 |
| Example 11 | 460 | 15 |
| Example 12 | 455 | 10 |
| Example 13 | 390 | 11 |
| Example 14 | 335 | 8 |
| Example 15 | 340 | 12 |
| Example 16 | 335 | 14 |
| Example 17 | 455 | 13 |
| Example 18 | 460 | 12 |
| Example 19 | 460 | 14 |
| Example 20 | 465 | 11 |
| Example 21 | 395 | 13 |
| Example 22 | 330 | 16 |
| Example 23 | 335 | 13 |
| Example 24 | 340 | 11 |

A comparison between Examples 1 to 4 and Examples 5 to 8, between Examples 9 to 12 and Examples 13 to 16, and between Examples 17 to 20 and Examples 21 to 24, shows that when a sintered body and a capacitor each is manufactured using a niobium powder having a tantalum content of about 700 ppm by mass or less, the sintered body and the capacitor are not reduced in the CV value or capacitance.

While the invention has been described in detail and with reference to 10 specific embodiments thereof, it will be apparent to one skilled in the art that various changes and modifications can be made therein without departing from the spirit and scope thereof.

What is claimed is:

1. A niobium granule comprising niobium and tantalum, wherein the tantalum is present in an amount of at most about 700 ppm by mass, and wherein the niobium granule is obtained by standing niobium powder at a high temperature to obtain a coagulation-solidified powder and then cracking the coagulation-solidified powder.

2. The niobium granule as claimed in claim 1, wherein the niobium granule is partially nitrided.

3. The niobium granule as claimed in claim 2, wherein the amount nitrided is from about 10 to about 100,000 of ppm by mass.

4. The niobium granule as claimed in claim 1, wherein the high temperature is from 500–2000° C.

* * * * *